Oct. 1, 1935.    L. EDELMANN    2,016,193

THERMOMETER HOUSING FOR THERMO-HYDROMETERS AND THE LIKE

Filed July 26, 1932

INVENTOR.
Leo Edelmann
BY Lloyd W. Patch
ATTORNEY.

Patented Oct. 1, 1935

2,016,193

UNITED STATES PATENT OFFICE 2,016,193

THERMOMETER HOUSING FOR THERMO-HYDROMETERS AND THE LIKE

Leo Edelmann, Chicago, Ill., assignor to E. Edelmann & Co., Chicago, Ill., a corporation of Illinois Application July 26, 1932, Serial No. 624,861

3 Claims. (Cl. 265—46)

My invention relates to thermometer housings for thermo-hydrometers and the like, and particularly to a structure of this character intended and adapted for use with hydrometers and the like having the thermometer separate from the float element.

An object of my invention is to provide a housing structure which can be readily assembled to completely enclose the thermometer and which can be handled and assembled in the instrument without fear of disturbing adjustments of or breaking the thermometer.

Another object is to so construct and arrange the parts that a thermometer can be quickly and readily fitted and adjusted with respect to a fixed scale, and that the parts are not exposed to disturb this adjustment when the housing is handled or fitted in place for use.

Another object is to provide a housing which can be made up and assembled with the thermometer carried thereby, the housing to be constructed and sold as a replacement unit to be readily and easily fitted in connection with a hydrometer or other similar instrument without requiring the exercise of special skill or the use of special tools.

Yet another object is to provide a structure of this nature which is of simple and inexpensive construction and which can be readily assembled to be sold at a low price to individual users for replacement by the individual rather than requiring return of the thermo-hydrometer or other instrument to the factory for replacements.

With the above and other objects in view which will be apparent to those skilled in the art, this invention includes certain novel features of construction and combinations of parts which will be hereinafter set forth in connection with the drawing and then pointed out in the claims.

Figure 1:
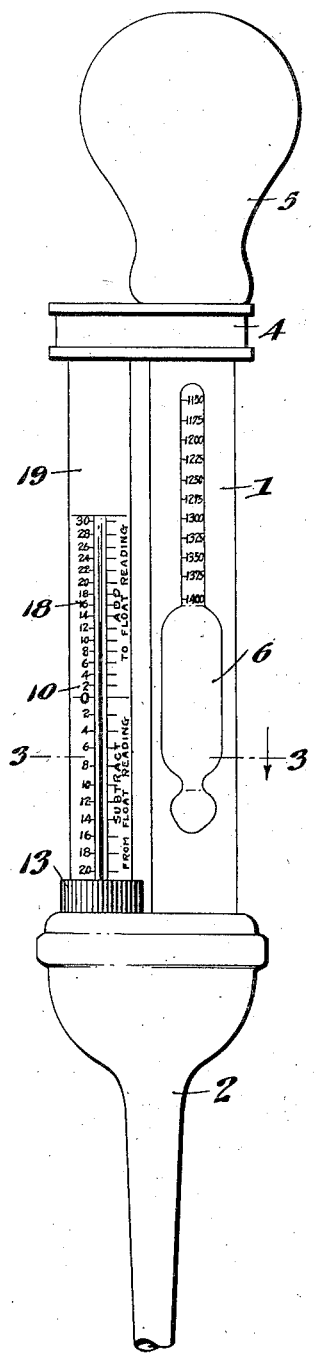
Figure 1 is a view in side elevation of a thermo-hydrometer showing my invention embodied therewith.
Figure 2:
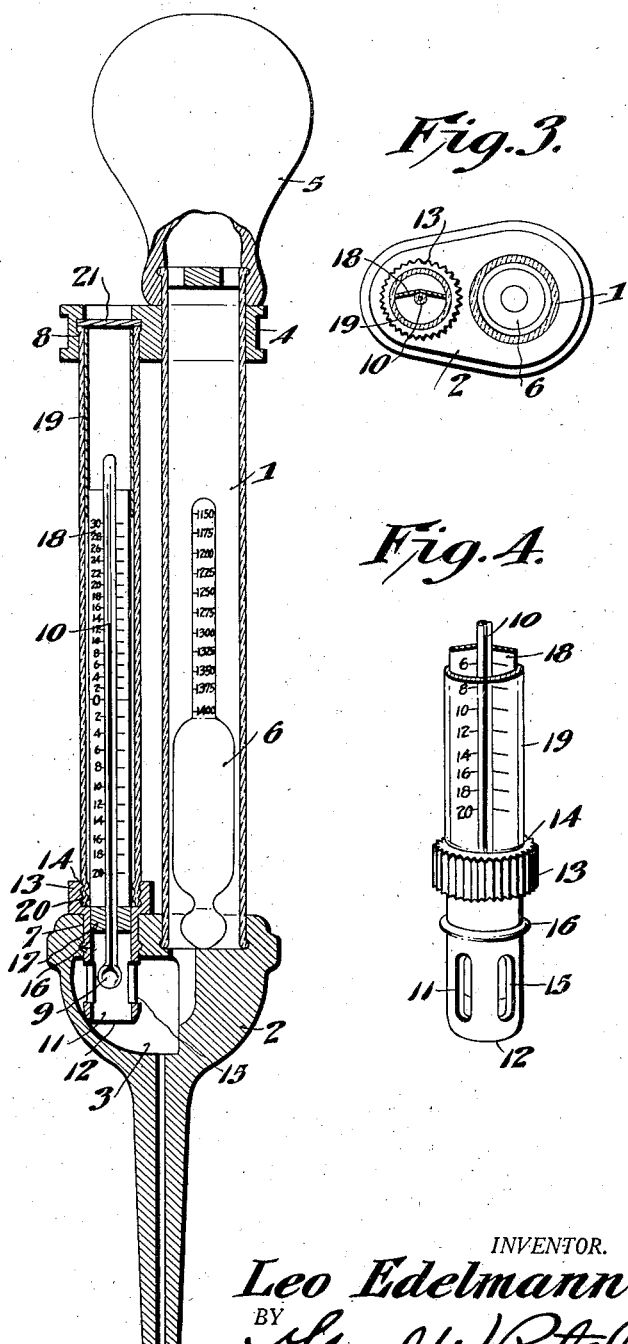
Fig. 2 is a longitudinal sectional view through the structure shown in Fig. 1.
Figure 3:
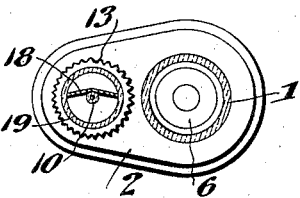
Fig. 3 is a horizontal sectional view substantially on the line 3—3 of Fig. 1.
Figure 4:
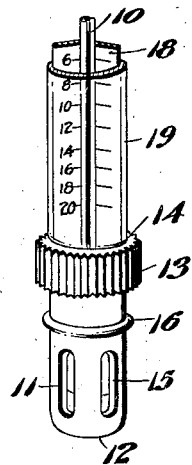
Fig. 4 is a perspective view showing the lower end of the thermometer housing.

In the present instance I have illustrated my improved thermometer housing fitted in conjunction with a thermo-hydrometer having the float barrel 1 thereof fitted at one end within a nozzle member 2 having an enlarged chamber 3, and the other end extending through a spacing collar 4 to receive the usual bulb 5. The float element 6 is received in the barrel 1 and to all intents and purposes the parts can be of any desired form, construction and assembly.

The nozzle tip member 2 has an opening 7 therethrough into the chamber 3, and the spacing collar 4 has an opening 8 substantially alined therewith.

The thermometer is of the usual type including the bulb 9 and capillary tube 10, and with present methods of manufacture it is possible to make thermometers with such a degree of accuracy that a fixed type of scale can be used, adjustments being made up or down in accordance with the height of the indicating column within the capillary tube at a fixed temperature.

A tubular housing cage 11 is tapered off externally at one end as at 12 and at its other end has an enlarged or flared portion 13 internally screw-threaded as at 14 with a round or rolled form of thread. This cage is entirely open at both ends and the tapered end 12, which is adapted to be received through the opening 7 and submerged within liquid contained within the chamber 3 is provided with openings 15 for better circulation of liquid. It is perhaps desirable that a bead 16 be provided around the housing cage 11 to insure that said cage will be held against accidental or casual displacement from the opening 7.

A plug 17 fitted within the housing cage adjacent the flared portion 13, has a gauge scale 18 carried thereby and is provided with an opening to receive the capillary tube 10 of the thermometer in such relation that the bulb 9 of the thermometer will be substantially centered within the tubular portion of the housing cage adjacent openings 15. With this arrangement of the parts the capillary tube 10 can be slipped through the opening to bring the top of the indicating column of the thermometer to the desired gauge indication for the predetermined temperature, in assembling the instrument, and in this way quick and accurate adjustments can be made without exposing the bulb end 9 of the thermometer outside of the housing cage, even though it may extend to a greater or less degree below the plug 17 due to variations of the quantity of liquid or other indicating column material. With the parts assembled in this way the gauge scale, thermometer and the housing cage are substantially a unit, and can be handled without disturbing adjustments of the same, and as the capillary tube 10 lies adjacent the gauge scale member 18 it will be more or less protected.

A tubular thermometer housing 19, of glass or other suitable transparent material is made of an inside diameter to fit over the gauge scale 18 and is externally threaded at its lower end at 20 to be turned into the threaded flared portion 13, so that this transparent housing and the housing cage 11 will be assembled as a unit. The transparent housing 19 is made sufficiently long that its outer end will fit within the opening 8 of the spacing collar 4 and this end might be closed by the disk 21, by a plug of suitable material or by any other means. Through extensive manufacture and sale of thermo-hydrometers of the type illustrated, it has been found that in handling and use there is considerable breakage of the transparent housing 19, or of the thermometer, and heretofore it has been found necessary to have such damaged instruments returned to the factory for replacement of the parts, as no way had been discovered to so construct the parts that replacement portions could be sold separately to be fitted by the individual user.

From the foregoing it will be seen that I have provided a thermometer housing and thermometer structure which can be readily assembled in course of manufacture, and which is of such character that it can be fitted to a thermo-hydrometer structure in course of manufacture and as a replacement part, without the use of special instructions or tools, and without danger of disturbing adjustments or breaking frangible portions.

While I have herein shown and described my invention embodied with only one particular form and construction of thermo-hydrometer and have suggested only certain possible modifications, it will be appreciated that many changes and variations can be made in the form, construction, and arrangement of the parts to suit various requirements of construction and use without departing from the spirit and scope of my invention.

I claim:

1. With a syringe thermo-hydrometer having a liquid receiving barrel with a float element therein and a rubber nozzle carrying sleeve having a liquid pocket therein associated with said liquid receiving barrel and provided with an opening to receive a thermometer, a thermometer housing comprising a rigid housing cage of tubular form open and reduced at one end for insertion through the opening of the rubber nozzle carrying sleeve to be held in liquid-tight connection therein and having a flared portion at the other end, a perforated rubber packing member fitted within said tubular housing cage adjacent to the flared portion, a thermometer fitted through the opening of said rubber packing member with its bulb end within the open end of the housing cage and protected thereby and its tube extending substantially centrally in the flared end of the housing cage, a scale member mounted adjacent to the tube of the thermometer, and a transparent tubular housing member fitted and held within the flared portion of said housing cage and thus removably disposed around said thermometer gauge member and the thermometer tube.

2. With a syringe thermo-hydrometer having a liquid receiving barrel with a float element therein and a rubber nozzle carrying sleeve having a liquid pocket therein associated with said liquid receiving barrel and provided with an opening to receive a thermometer, a thermometer housing comprising a rigid housing cage of tubular form open and reduced at one end for insertion through the opening of the rubber nozzle carrying sleeve to be held in liquid-tight connection therein and having a flared portion at the other end, a perforated rubber packing member fitted within said tubular housing cage adjacent to the flared portion, a thermometer fitted through the opening of said rubber packing member with its bulb end within the open end of the housing cage and protected thereby and its tube extending substantially centrally in the flared end of the housing cage, a scale member mounted adjacent to the tube of the thermometer, a transparent tubular housing member fitted and held within the flared portion of said housing cage and thus removably disposed around said thermometer gauge member and the thermometer tube, said rubber nozzle carrying sleeve within the opening being provided with a peripheral groove, and a correspondingly shaped bead on said housing cage seated within the groove when the housing cage is fitted in place to thus retain the housing cage against casual and accidental displacement.

3. With a syringe thermo-hydrometer having a liquid receiving barrel with a float element therein and a rubber nozzle carrying sleeve having a liquid pocket therein associated with said liquid receiving barrel and provided with an opening to receive a thermometer, a thermometer housing comprising a rigid housing cage of tubular form open and reduced at one end for insertion through the opening of the rubber nozzle carrying sleeve to be held in liquid-tight connection therein and having a flared portion at the other end, a perforated rubber packing member fitted within said tubular housing cage adjacent to the flared portion, a thermometer fitted through the opening of said rubber packing member with its bulb end within the open end of the housing cage and protected thereby and its tube extending substantially centrally in the flared end of the housing cage, a scale member mounted adjacent to the tube of the thermometer, a transparent tubular housing member fitted and held within the flared portion of said housing cage and thus removably disposed around said thermometer gauge member and the thermometer tube, said thermometer having a capillary tube fitted slidably and adjustably through the opening of the rubber packing member to thus be adjusted relatively with respect to the gauge member, and said housing cage having the open end thereof made relatively long to protect and house the bulb of the thermometer in any adjustment thereof, said flared end of the housing cage being provided with internal screw threads and the transparent housing being provided with external screw threads to be thus readily assembled and disassembled to be rigidly held as a unit with the housing cage.

LEO EDELMANN.